United States Patent
Brazell

[15] 3,707,081
[45] Dec. 26, 1972

[54] GEAR TYPE COUPLING
[72] Inventor: James W. Brazell, Atlanta, Ga.
[73] Assignee: Heath International, Inc., Richmond, Mich.
[22] Filed: Feb. 16, 1971
[21] Appl. No.: 115,410

[52] U.S. Cl. ................................................64/9 R
[51] Int. Cl. .................................................F16d 3/18
[58] Field of Search ................................64/16, 9

[56] References Cited

UNITED STATES PATENTS 3,279,216  10/1966  Spaulding ...............................64/9
1,983,007  12/1934  Simons ................................64/9 X
2,595,513  5/1952   Cureton ...............................64/9

FOREIGN PATENTS OR APPLICATIONS 4,422,843  9/1964   Japan ..................................64/9

Primary Examiner—Edward G. Favors
Attorney—Donnelly, Mentag & Harrington

[57] ABSTRACT

A gear type flexible coupling which includes a pair of coupling members connected by a splined sleeve and wherein the coupling members are retained in a spaced apart arrangement by a cushion member.

1 Claim, 3 Drawing Figures

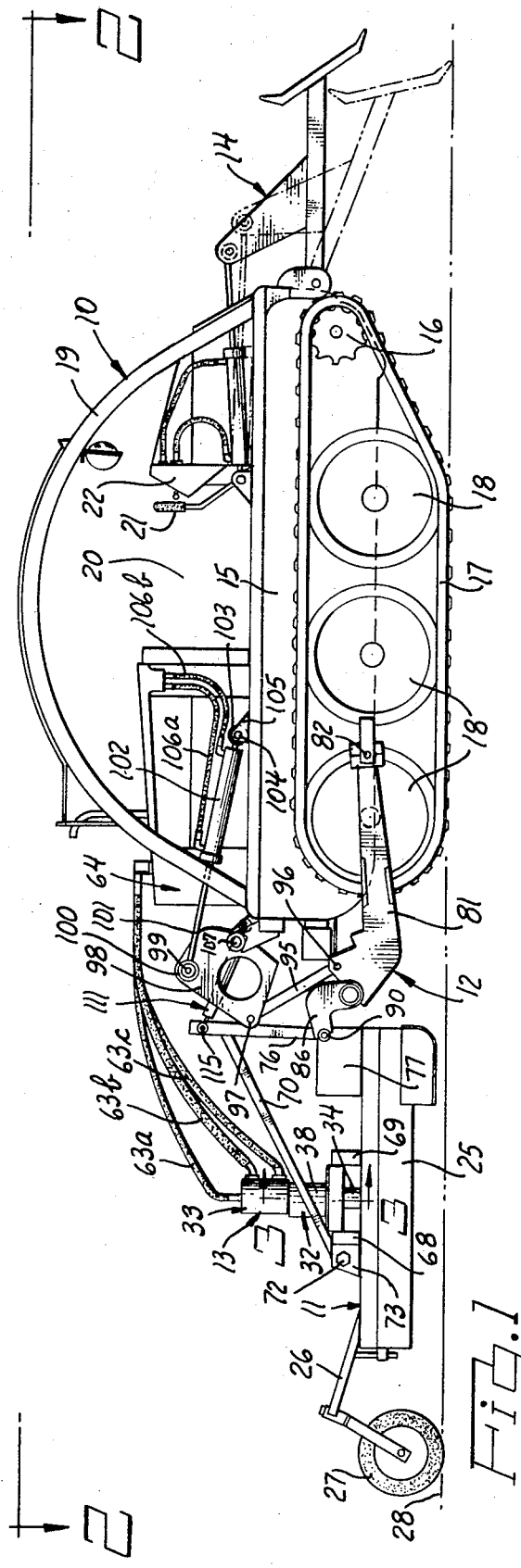

INVENTOR.
JAMES W. BRAZELL
BY
Donnelly, Mentag & Harrington
ATTORNEYS

GEAR TYPE COUPLING

SUMMARY OF THE INVENTION

This invention relates generally to shaft couplings and more particularly, to a gear type coupling of the self aligning type for connecting a power means to a driven means.

It is an important object of the present invention to provide a novel and improved gear type coupling which is adapted to connect a drive shaft to a driven shaft and to absorb any misalignment between the drive shaft and the driven shaft. The coupling of the present invention is constructed and arranged primarily for use in a vertical position, however, it will be understood that it may also be used in other positions The coupling includes two coupling members connected by a connector sleeve, with one member being connected to a drive shaft and the other member being connected to a driven shaft, and wherein a cushion means is provided between the two coupling members to support the weight of the connector sleeve and associated seals and snap rings and one of the coupling members and thus prevent contact between the coupling members.

It is another object of the present invention to provide a novel and improved gear type coupling which is simple and compact in construction, economical to manufacture and efficient in operation.

Other features and advantages of this invention will be apparent from the following detailed description, appended claims, and the accompanying drawings.

BRIEF DESCRIPTION OF THE DRAWINGS

FIG. 1 is a side elevational view of a tractor drawn mower provided with a gear type drive coupling made in accordance with the principles of the present invention.

FIG. 2 is a top plan view of the structure illustrated in FIG. 1, taken along the line 2—2 thereof, and looking in the direction of the arrows.

DESCRIPTION OF THE PREFERRED EMBODIMENT

Figure 3:
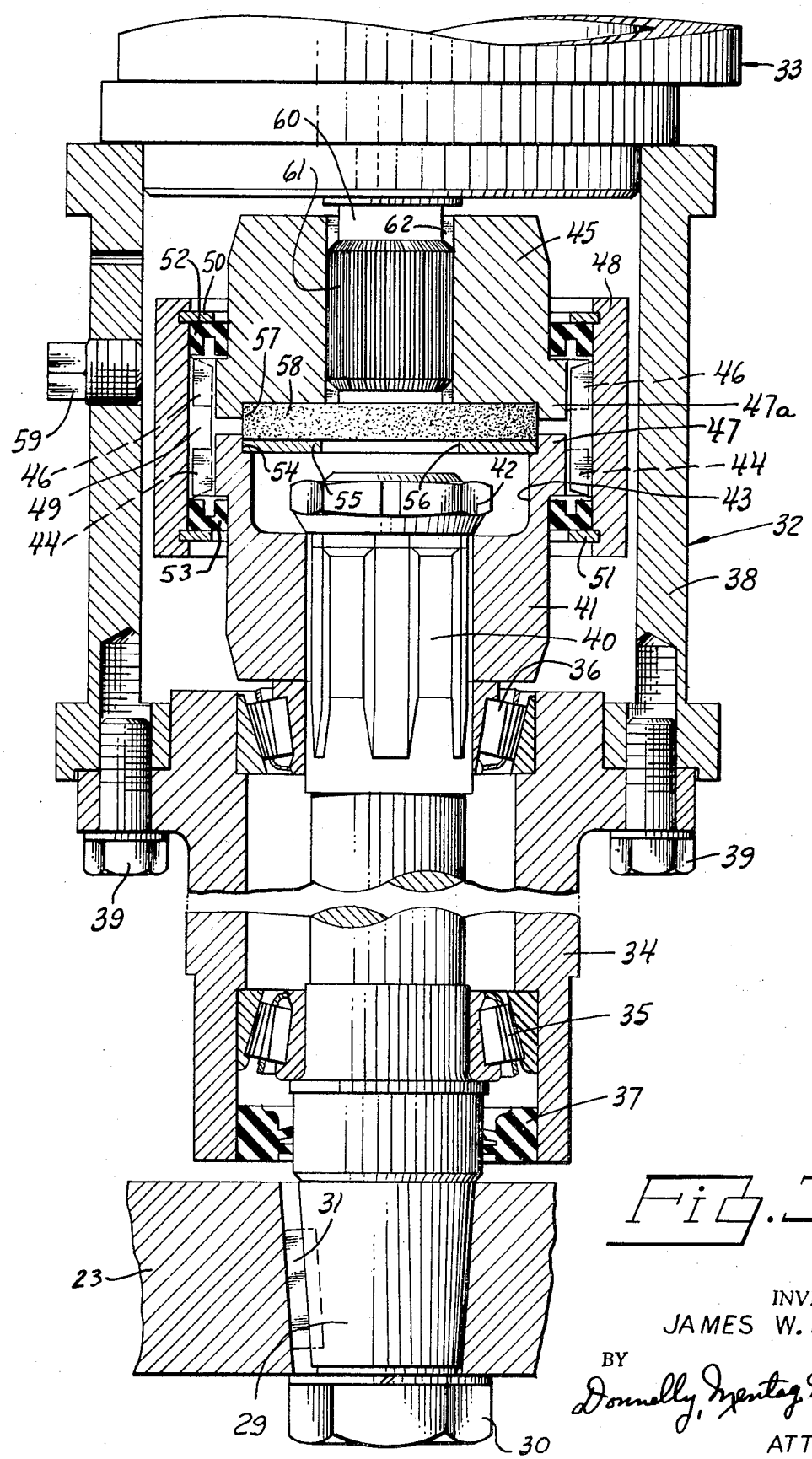
FIG. 3 is a fragmentary, enlarged, broken, elevational, section view of the gear type coupling structure illustrated in FIG. 1, taken along the line 3—3 thereof, and looking in the direction of the arrows.

Referring now to the drawings, and in particular to FIG. 1, WHEREIN IS SHOWN AN ILLUSTRATED EMBODIMENT OF the invention employed for coupling the rotary cutter of a mower to a hydraulic motor, the numeral 10 generally designates a flexible tracked vehicle. The numeral 11 generally designates a rotary cutter mower assembly which is operatively attached to the vehicle 10 by a universal three-point lift hitch assembly generally indicated by the numeral 12. The numeral 13 designates a rotary drive assembly employed for rotating the rotary cutter of the mower assembly 11. The numeral 14 generally designates a dozer blade or scraper blade assembly which is operatively mounted on the front end of the vehicle 10.

The flexible tracked vehicle 10 may be selected from any suitable vehicle of this type now available on the market, as, the Model example, the Model J-5 tractor available on the market from the Bombardier Ltd. of Valcourt, Quebec. The numeral 15 designates the body of the vehicle in which is mounted the vehicle engine and power drive means. The power drive means of the vehicle 10 includes a drive sprocket 16 on each side of the vehicle, each of which is adapted to drive a flexible track 17 that is operatively trained around a plurality of wheels 18. The numeral 19 in FIGS. 1 and 2 designates a head cover and guard for the operator of the tracked vehicle who would be seated in the seating area 20. The numeral 21 designates one of two similar levers used for steering and braking the vehicle. The numeral 22 designates a vehicle instrument and control board.

As illustrated in FIG. 2, the rotary cutter assembly 11 includes a rotary cutter comprising a rotor member 23 on which is operatively mounted a pair of oppositely disposed cutter blades 24. The rotor member 23 is operatively mounted within a suitable guard housing 25 which is made from a suitable metal or the like. A wheel supporting bracket 26 is adjustably attached to the rear end of the housing 25 and it rotatably carries a support wheel 27 which is adapted to roll on the ground surface 28 and maintain the rear end of the cutter housing 25 in a predetermined elevation above the ground surface 28.

As best seen in FIG. 3, the rotor member 23 is attached to the lower end of a drive spindle or shaft 29 by a nut and lock washer assembly 30 and a key 31. The spindle 29 comprises the driven shaft of a gear type coupling, generally indicated by the numeral 32. The coupling 32 is operatively connected to and driven by a suitable hydraulic motor generally indicated by the numeral 33.

As shown in FIG. 3, the spindle 29 is rotatably mounted in a spindle housing 34 by a pair of tapered roller bearings 35 and 36. A suitable annular seal 37 is operatively mounted around the lower end of the spindle 29 in the housing 34. a coupling housing 38 is releasably secured to the upper end of the spindle housing 34 by a plurality of suitable lock washers and bolts 39.

As shown in FIG. 3, the upper end of the spindle 29 is provided with a suitable spline 40 on which is operatively mounted a coupling member 41 that is secured to the spindle 29 by a lock nut 42. The lock nut 42 is seated in a recess 43 formed in an upper enlarged head portion of the coupling member 41. The coupling member 41 is provided with a peripheral spline 44 around the periphery of an enlarged upper end portion. The numeral 45 designates a second coupling member or motor coupling member which is shaped similar to the spindle coupling member. An enlarged lower end portion 47a of the motor coupling member 45 is provided with spline 46 around the periphery thereof. The coupling members 41 and 45 are drivably connected by a coupling sleeve 48 which is provided with an internal spline 49 that is adapted to mesh with and connect the splines 44 and 46. The coupling sleeve 48 is secured in an operative position by a pair of retainer snap rings 50 and 51, and a pair of annular seals 52 and 53 which are seated on shoulders formed by the enlarged coupling portions 47 and 47a.

As shown in FIG. 3, the recess 43 which is formed in the upper end of the coupling member 41 is provided with an enlarged step at the outer end thereof to provide a shoulder 54 on which is seated a suitable metal washer 55 that is provided with an axial hole 56. The upper coupling member 45 is provided with a recess in its enlarged lower end 47 that is indicated by the numeral 57 and in which is operatively seated a cylindrical cushion 58 made from a suitable material such as rubber. The cushion 58 is adapted to engage and seat on the washer 55. The housing 38 is adapted to be provided with suitable lubricating fluid which may be inserted through a suitable hole formed in the housing 38 and closed by a pipe plug 59.

As shown in FIG. 3, the hydraulic coupling drive motor 33 is provided with a drive shaft 60 which has a splined end 61 that is adapted to be seated in a splined hole 62 formed in the upper end of the motor coupling portion 45.

As shown in FIG. 1, the hydraulic motor 33 is adapted to be operatively connected to a suitable source 64 of hydraulic pressurized fluid, which is carried on the vehicle 10, by a plurality of hydraulic connecting hoses as 63a, 63b and 63c.

As shown in FIG. 2, the coupling is provided with a pair of flanges 65 which are supported on a pair of spaced apart, longitudinally extended, support angle members 67 which are carried on a pair of transversely mounted angle bar members 68 and 69.

As shown in FIG. 2, the mower 11 is provided with a lift bracket which includes a pair of elongated angle bars 70 and 71, which extend rearwardly and downwardly, as shown in FIG. 1. The rear or lower ends of each of the angle bars 70 and 71 are suitably attached to the mower housing 25. As illustrated in FIG. 2, the front or upper ends of the angle bars 70 and 71 converge and are fixedly connected to each other and to a pair of vertically extended transverse lift bracket arms 75 and 76, by any suitable means, as by welding. The lower ends of the bracket arms 75 and 76 are fixed to the vertically disposed plates 77 and 78 by any suitable means, as by welding.

The universal three-point lift hitch 12 includes a lower link assembly that comprises a transverse tubular shaft which is fixedly secured to the rear ends of a pair of spaced apart, elongated links as 81, by any suitable means, as by welding. As illustrated in FIG. 1, the right link 81 extends forwardly and along one side of the vehicle 10. The other left link extends forwardly along the left side of the vehicle 10. The front ends of each of the links 81 are pivotally connected to the vehicle 10 at a low point. Each of these links is similarly connected and the connection of only one of the links has been illustrated in FIG. 1. As best seen in FIG. 1, the front end of the link 81 is rotatably mounted by a suitable trunnion means, as indicated by the numeral 82, to the frame of the vehicle 10 at a low point on the vehicle, and at a point which is substantially aligned in height with the axes of rotation of the vehicle wheels 18.

The lower link assembly is hingedly connected to the mower 11 at two spaced apart points by a pair of link arms 86. The upper ends of the link arms 86 are provided with suitable ball joints attached by suitable pins 89 and 90 to the mower 11.

The lower link assembly is adapted to be lifted or raised by the following described structure. As best seen in FIG. 1, a lift link or bar 95 is provided on the lower end thereof with a ball joint assembly 96 which is pivotally mounted to the upper side of the rear end of one of the links 81. The upper end of the lift link 95 is hingedly attached by a similar ball joint assembly, indicated by the numeral 97, to a lift lever 98. The lift lever 98 is formed from a plate. As shown in FIG. 1, the lift lever 98 is hingedly connected by a hinge pin means 99 to a ball joint 100 operatively carried on the outer end of the hydraulic cylinder rod 101 of a hydraulic cylinder 102. The head end of the hydraulic cylinder 102 is hingedly connected by a ball joint 103 and a suitable hinge pin 104 to a support bracket formed by a pair of spaced apart bracket plates 105 which are fixedly secured to the vehicle 10 by any suitable means, as by welding. The hydraulic cylinder 102 is supplied with hydraulic fluid under pressure through the hydraulic hoses 106a and 106b.

The lever 98 is hingedly supported (FIG. 2) on the vehicle 10 by a pivot pin 107 which is rotatably mounted in a tube on the vehicle 10. As shown in FIG. 1, the lift hitch structure includes an upper lift link 111. As shown in FIG. 2, the link 111 is hingedly connected at 115 to the lift bracket arms 75 and 76, and at 118 to the vehicle 10.

In use, it will be seen that when the hydraulic motor 33 is actuated, the motor coupling member 45 will be rotated. The splined connection formed by the splines 44, 46 and 49 will convey the driving force through the sleeve 48 and to the coupling lower member or spindle member 41. It will be seen that the gear coupling of the present invention is a simple and compact coupling, and that it is economical to manufacture. The coupling can be used in a hydraulic drive system of the type illustrated to provide a drive system which can absorb shocks much better than a mechanical drive system which is interconnected between a drive engine and an implement having a driven member. The cushion 58 supports the upper coupling member 45 and prevents it from coming in contact with the lower coupling member 41. The washer 55 reinforces the cushion 58. The cushion 58 flexes as required to allow relative motion due to misalignment between the coupling members 45 and 41 which may also be called coupling hubs or coupling halves.

The details of the lift hitch 12 are disclosed in my copending application which is owned by a common assignee, entitled "Universal Three-Point Implement Hitch." The details of the rotary cutter mower assembly 11 are disclosed in a copending application in which I am named as a coinventor and which is owned by a common assignee and entitled "Tractor Drawn Mower".

While it will be apparent that the preferred embodiment of the invention herein disclosed is well calculated to fulfill the objects above stated, it will be appreciated that the invention is susceptible to modification, variation and change.

What is claimed is:

1. In a gear type coupling, the combination comprising:
   a. a first coupling member attached to a driven shaft;
   b. a second coupling member attached to a drive shaft;
   c. a metallic connector sleeve splined to said first and second coupling members for operatively connecting said coupling members;
   d. each of said coupling members being provided with an annular recess on the end thereof adjacent the other coupling member;

e. a metallic washer operatively mounted in the annular recess in one of said coupling members; and,
f. a non-metallic cushion member having one end thereof mounted in the annular recess in the other of said coupling members and the other end thereof extended into the annular recess in said one coupling member and in seating engagement with said washer.

* * * * *